United States Patent
Morisaki

(10) Patent No.: US 10,455,074 B2
(45) Date of Patent: Oct. 22, 2019

(54) INFORMATION PROCESSING SYSTEM, INFORMATION PROCESSING TERMINAL, AND CONTROL METHOD AND CONTROL PROGRAM OF INFORMATION PROCESSING TERMINAL

(71) Applicant: NEC CORPORATION, Tokyo (JP)

(72) Inventor: Mitsunori Morisaki, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/087,153

(22) PCT Filed: Jan. 18, 2017

(86) PCT No.: PCT/JP2017/001524
§ 371 (c)(1),
(2) Date: Sep. 21, 2018

(87) PCT Pub. No.: WO2017/163558
PCT Pub. Date: Sep. 28, 2017

(65) Prior Publication Data
US 2019/0104215 A1    Apr. 4, 2019

(30) Foreign Application Priority Data

Mar. 23, 2016  (JP) ................................ 2016-058016

(51) Int. Cl.
*H04M 1/00* (2006.01)
*H04M 1/725* (2006.01)
(Continued)

(52) U.S. Cl.
CPC ......... *H04M 1/72563* (2013.01); *H04M 1/00* (2013.01); *H04M 1/72555* (2013.01);
(Continued)

(58) Field of Classification Search
CPC ............... H04M 1/72563; H04M 1/00; H04M 1/72555; H04M 11/00; H04M 2203/252;
(Continued)

(56) References Cited

U.S. PATENT DOCUMENTS

2002/0113861 A1   8/2002  Lim et al.
2007/0002128 A1*  1/2007  Sawada .................. H04N 5/232
                                                  348/14.01
(Continued)

FOREIGN PATENT DOCUMENTS

| JP | 07-312746 A | 11/1995 |
| JP | 2006-352661 A | 12/2006 |
| JP | 2016-019155 A | 2/2016 |

OTHER PUBLICATIONS

International Search Report for PCT/JP2017/001524, dated Apr. 11, 2017.

*Primary Examiner* — Khai M Nguyen
(74) *Attorney, Agent, or Firm* — Sughrue Mion, PLLC

(57) ABSTRACT

An information processing system includes first and second terminals for acquiring a desired image captured actively using a speech communication partner's apparatus during speech communication. The first terminal includes a first microphone, a first transmitter that transmits voice data to the second terminal, and a first receiver that receives voice data from the second terminal. The second terminal includes a camera, a second microphone, a second transmitter that transmits the voice data to the first terminal, and a second receiver that receives the voice data from the first terminal. During speech communication, the first transmitter transmits, together with the voice data, an operation command for operating the camera. The second receiver receives the operation command and operates the camera. During speech (Continued)

communication with the first terminal, the second transmitter transmits, together with the voice data, the image data captured by the camera.

7 Claims, 6 Drawing Sheets

(51) Int. Cl.
  *H04M 11/00* (2006.01)
  *H04N 5/232* (2006.01)
  *H04N 7/14* (2006.01)

(52) U.S. Cl.
  CPC ...... *H04M 11/00* (2013.01); *H04N 5/232933* (2018.08); *H04N 7/147* (2013.01); *H04M 2203/252* (2013.01); *H04N 2007/145* (2013.01)

(58) Field of Classification Search
  CPC ............. H04N 5/232933; H04N 7/147; H04N 2007/145
  See application file for complete search history.

(56) References Cited

U.S. PATENT DOCUMENTS

| | | | |
|---|---|---|---|
| 2015/0244979 A1* | 8/2015 | Andrada | H04N 7/148 348/14.07 |
| 2016/0014322 A1 | 1/2016 | Kimura | |
| 2017/0104804 A1* | 4/2017 | Do | H04L 65/602 |

* cited by examiner

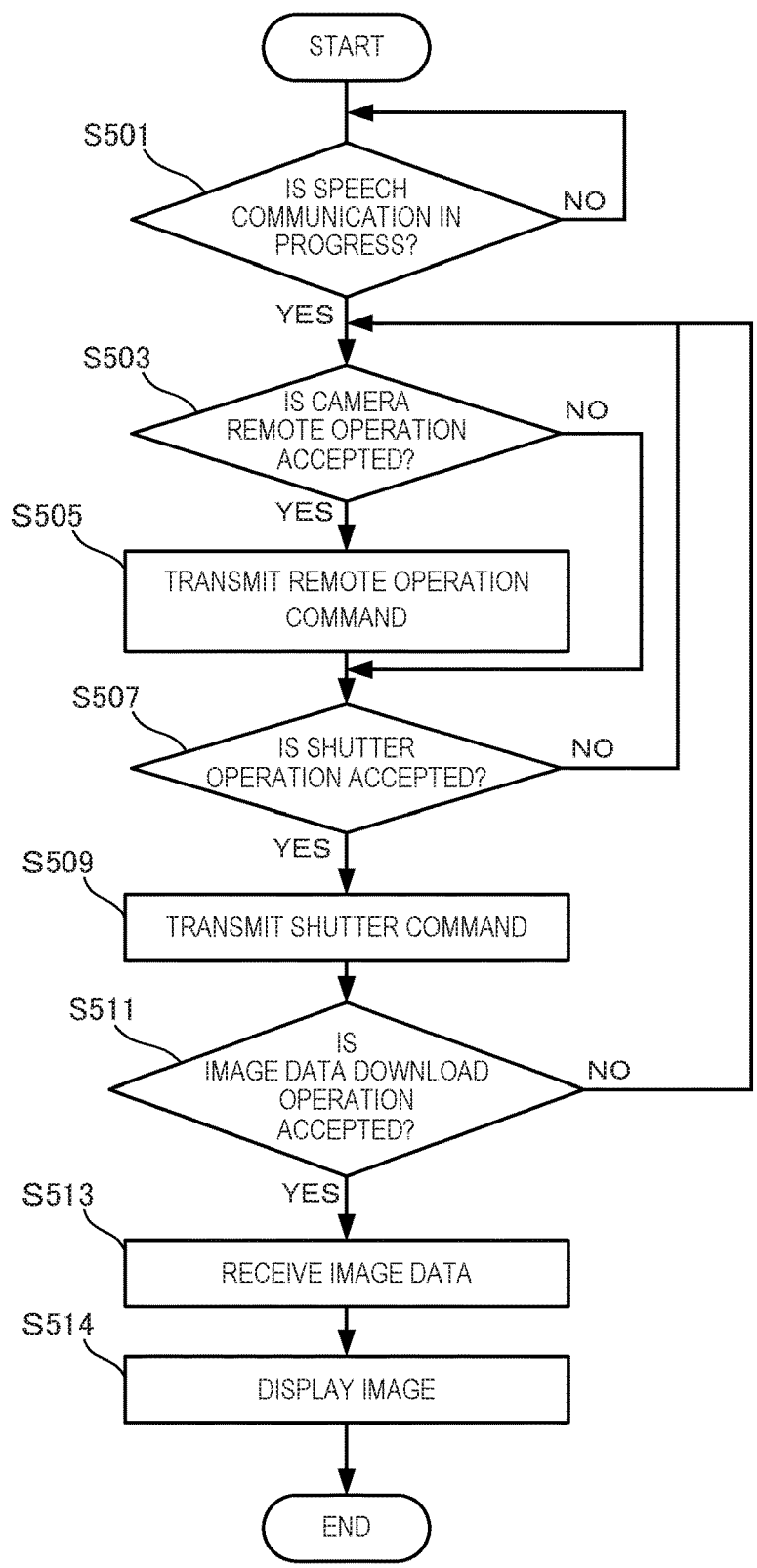
F I G. 5

INFORMATION PROCESSING SYSTEM, INFORMATION PROCESSING TERMINAL, AND CONTROL METHOD AND CONTROL PROGRAM OF INFORMATION PROCESSING TERMINAL

CROSS REFERENCE TO RELATED APPLICATIONS

This Application is a National Stage of International Application No. PCT/JP2017/001524 filed Jan. 18, 2017, and is based upon and claims the benefit of priority from Japanese patent application No. 2016-058016, filed on Mar. 23, 2016, the disclosure of which is incorporated herein in its entirety by reference.

TECHNICAL FIELD

The present invention relates to an information processing system, an information processing terminal, and a control method and control program of the information processing terminal.

BACKGROUND ART

In the above technical field, patent literature 1 discloses a technique of acquiring a still image during video phone communication.

CITATION LIST

Patent Literature

Patent literature 1: Japanese Patent Laid-Open No. 07-312746

SUMMARY OF THE INVENTION

Technical Problem

In the technique described in the above literature, however, only a still image sent from a speech communication partner is received, and it is impossible to capture a desired image actively.

The present invention enables to provide a technique of solving the above-described problem.

Solution to Problem

One example aspect of the present invention provides an information processing system comprising a first information processing terminal and a second information processing terminal, the first information processing terminal including a first microphone that generates voice data by receiving a voice, a first transmitter that transmits the voice data acquired from the first microphone by specifying the second information processing terminal as a speech communication partner terminal, and a first receiver that receives voice data from the second information processing terminal, and the second information processing terminal including a camera that generates image data by performing image capturing, a second microphone that generates voice data by receiving a voice, a second transmitter that transmits, during speech communication with the first information processing terminal, the voice data acquired from the second microphone to the first information processing terminal, and a second receiver that receives the voice data from the first information processing terminal, wherein during speech communication with the second information processing terminal, the first transmitter transmits, to the second information processing terminal, together with the voice data, an operation command for operating the camera incorporated in the second information processing terminal, the second receiver receives the operation command from the first information processing terminal, and operates the camera, and during speech communication with the first information processing terminal, the second transmitter transmits, to the first information processing terminal, together with the voice data acquired from the second microphone, the image data acquired by performing image capturing using the camera.

Another example aspect of the present invention provides an information processing terminal comprising:

a first microphone that generates voice data by receiving a voice;

a first transmitter that transmits the voice data acquired from the first microphone by specifying another information processing terminal as a speech communication partner terminal; and a first receiver that receives voice data from the other information processing terminal, wherein it is possible to communicate with the other information processing terminal including a camera that generates image data by performing image capturing, a second microphone that generates voice data by receiving a voice, a second transmitter that transmits, during speech communication with the information processing terminal, the voice data acquired from the second microphone to the information processing terminal, and a second receiver that receives the voice data from the information processing terminal, during speech communication with the other information processing terminal, the first transmitter transmits, to the other information processing terminal, together with the voice data, an operation command for operating the camera incorporated in the other information processing terminal, and during speech communication with the other information processing terminal, the first receiver receives, from the other information processing terminal, together with the voice data, the image data acquired by performing image capturing using the camera.

Still other example aspect of the present invention provides an information processing terminal capable of communicating with another information processing terminal including a first microphone that generates voice data by receiving a voice, a first transmitter that transmits the voice data acquired from the first microphone by specifying the information processing terminal as a speech communication partner terminal, and a first receiver that receives voice data from the information processing terminal, the information processing terminal comprising:
a camera that generates image data by performing image capturing;
a second microphone that generates voice data by receiving a voice;
a second transmitter that transmits, during speech communication with the other information processing terminal, the voice data acquired from the second microphone to the other information processing terminal; and
a second receiver that receives the voice data from the other information processing terminal,
wherein the second receiver receives, together with the voice data, an operation command for operating the camera from the other information processing terminal, and operates the camera, and
during speech communication with the other information processing terminal, the second transmitter transmits, to the other information processing terminal, together with the voice data acquired from the second microphone, the image data acquired by performing image capturing using the camera.

Still other example aspect of the present invention provides a control method of an information processing terminal including
a first microphone that generates voice data by receiving a voice,
a first transmitter that transmits the voice data acquired from the first microphone by specifying another information processing terminal as a speech communication partner terminal, and
a first receiver that receives voice data from the other information processing terminal,
the method comprising:
during speech communication with the other information processing terminal including
a camera that generates image data by performing image capturing,
a second microphone that generates voice data by receiving a voice,
a second transmitter that transmits, during speech communication with the information processing terminal, the voice data acquired from the second microphone to the information processing terminal, and
a second receiver that receives the voice data from the information processing terminal,
transmitting, to the other information processing terminal, together with the voice data, an operation command for operating the camera incorporated in the other information processing terminal; and
receiving, from the other information processing terminal, together with the voice data, the image data acquired by performing image capturing using the camera.

Still other example aspect of the present invention provides a control method of an information processing terminal capable of communicating with another information processing terminal including
a first microphone that generates voice data by receiving a voice,
a first transmitter that transmits the voice data acquired from the first microphone by specifying the information processing terminal as a speech communication partner terminal, and
a first receiver that receives voice data from the information processing terminal,
the information processing terminal including
a camera that generates image data by performing image capturing,
a second microphone that generates voice data by receiving a voice,
a second transmitter that transmits, during speech communication with the other information processing terminal, the voice data acquired from the second microphone to the other information processing terminal, and
a second receiver that receives the voice data from the other information processing terminal,
the method comprising:
operating the camera by receiving, together with the voice data, an operation command for operating the camera from the other information processing terminal; and
transmitting, during speech communication with the other information processing terminal, together with the voice data acquired from the second microphone, the image data acquired by performing image capturing using the camera to the other information processing terminal.

Still other example aspect of the present invention provides a control program of an information processing terminal including
a first microphone that generates voice data by receiving a voice,
a first transmitter that transmits the voice data acquired from the first microphone by specifying another information processing terminal as a speech communication partner terminal, and
a first receiver that receives voice data from the other information processing terminal,
the program for causing the information processing terminal to execute a method, comprising:
during speech communication with the other information processing terminal including
a camera that generates image data by performing image capturing,
a second microphone that generates voice data by receiving a voice,
a second transmitter that transmits, during speech communication with the information processing terminal, the voice data acquired from the second microphone to the information processing terminal, and
a second receiver that receives the voice data from the information processing terminal,
transmitting, to the other information processing terminal, together with the voice data, an operation command for operating the camera incorporated in the other information processing terminal; and
receiving, from the other information processing terminal, together with the voice data, the image data acquired by performing image capturing using the camera.

Still other example aspect of the present invention provides a control program of an information processing terminal capable of communicating with another information processing terminal including
a first microphone that generates voice data by receiving a voice,
a first transmitter that transmits the voice data acquired from the first microphone by specifying the information processing terminal as a speech communication partner terminal, and
a first receiver that receives voice data from the information processing terminal,
the information processing terminal including
a camera that generates image data by performing image capturing,
a second microphone that generates voice data by receiving a voice, a second transmitter that transmits, during speech communication with the other information processing terminal, the voice data acquired from the second microphone to the other information processing terminal, and a second receiver that receives the voice data from the other information processing terminal, the program for causing the information processing terminal to execute a method, comprising:

operating the camera by receiving, together with the voice data, an operation command for operating the camera from the other information processing terminal; and transmitting, during speech communication with the other information processing terminal, together with the voice data acquired from the second microphone, the image data acquired by performing image capturing using the camera to the other information processing terminal.

Advantageous Effects of Invention

According to the present invention, it is possible to acquire a desired image captured actively using the apparatus of a speech communication partner during speech communication.

BRIEF DESCRIPTION OF DRAWINGS

FIG. 5 is a flowchart illustrating the procedure of processing in an information processing terminal according to the second example embodiment of the present invention.

DESCRIPTION OF EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

First Example Embodiment

An information processing system 100 according to the first example embodiment of the present invention will be described with reference to FIG. 1. The information processing system 100 is a system including two information processing terminals 101 and 102.

Figure 1:
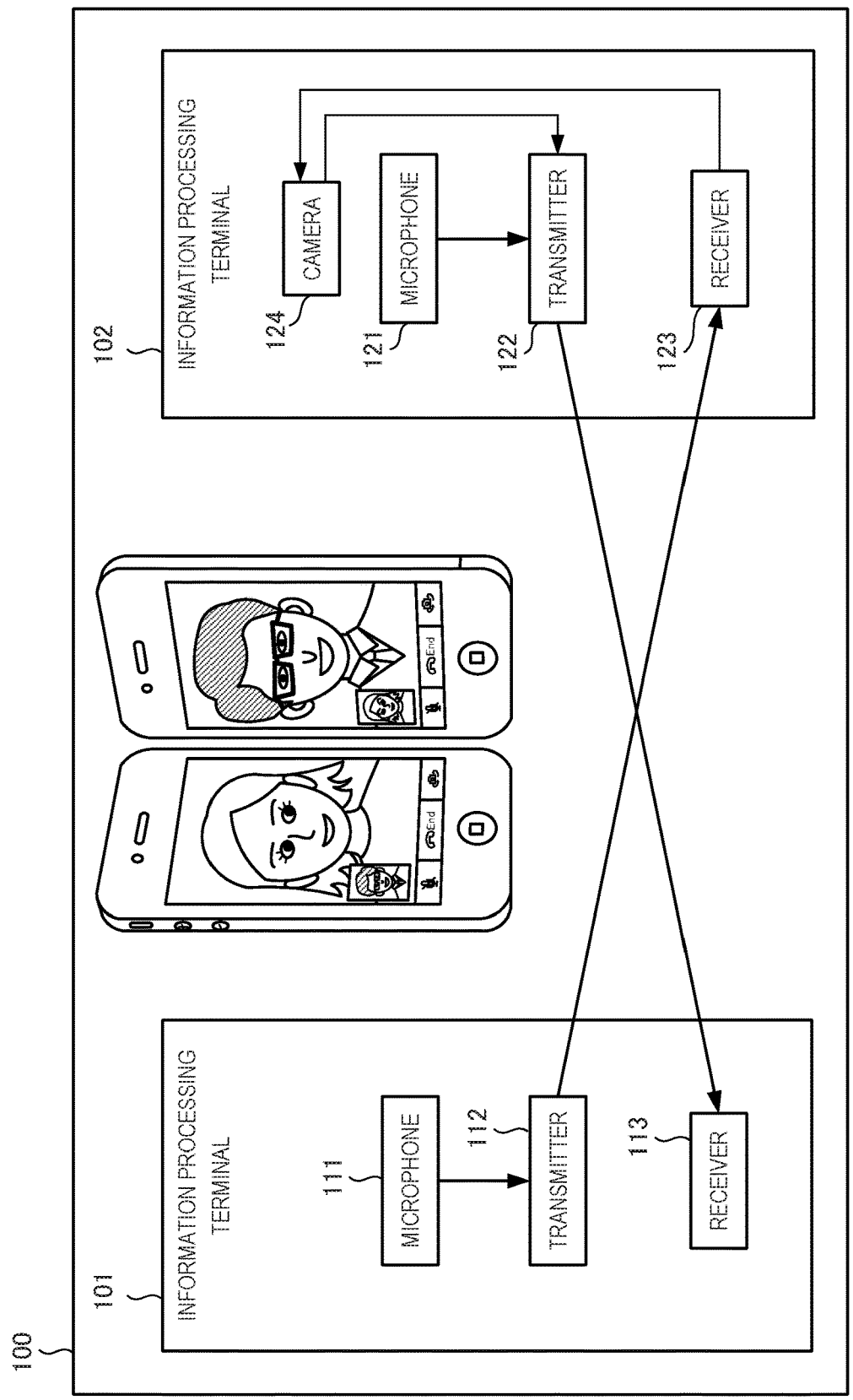
FIG. 1 is a block diagram showing the arrangement of an information processing system according to the first example embodiment of the present invention.

As shown in FIG. 1, the information processing terminal 101 includes a microphone 111, a transmitter 112, and a receiver 113. The information processing terminal 102 includes a microphone 121, a transmitter 122, a receiver 123, and a camera 124.

Each of the microphones 111 and 121 generates voice data by receiving a voice. The transmitter 112 specifies the information processing terminal 102 as a speech communication partner terminal, and transmits the voice data acquired from the microphone 111. The receiver 113 receives the voice data from the information processing terminal 102.

During speech communication with the information processing terminal 101, the transmitter 122 transmits, to the information processing terminal 101, the voice data acquired from the microphone 121. The receiver 123 receives the voice data from the information processing terminal 101. The camera 124 performs image capturing to generate image data.

During speech communication with the information processing terminal 102, the transmitter 112 transmits, to the information processing terminal 102, together with the voice data, an operation command for operating the camera 124 incorporated in the information processing terminal 102.

The receiver 123 receives the operation command from the information processing terminal 101, and operates the camera 124. During speech communication with the information processing terminal 101, the transmitter 122 transmits, to the information processing terminal 101, together with the voice data acquired from the microphone 121, the image data acquired by performing image capturing using the camera 124.

With the above-described arrangement, it is possible to perform image capturing very easily using the partner terminal during speech communication.

Second Example Embodiment

Figure 2:
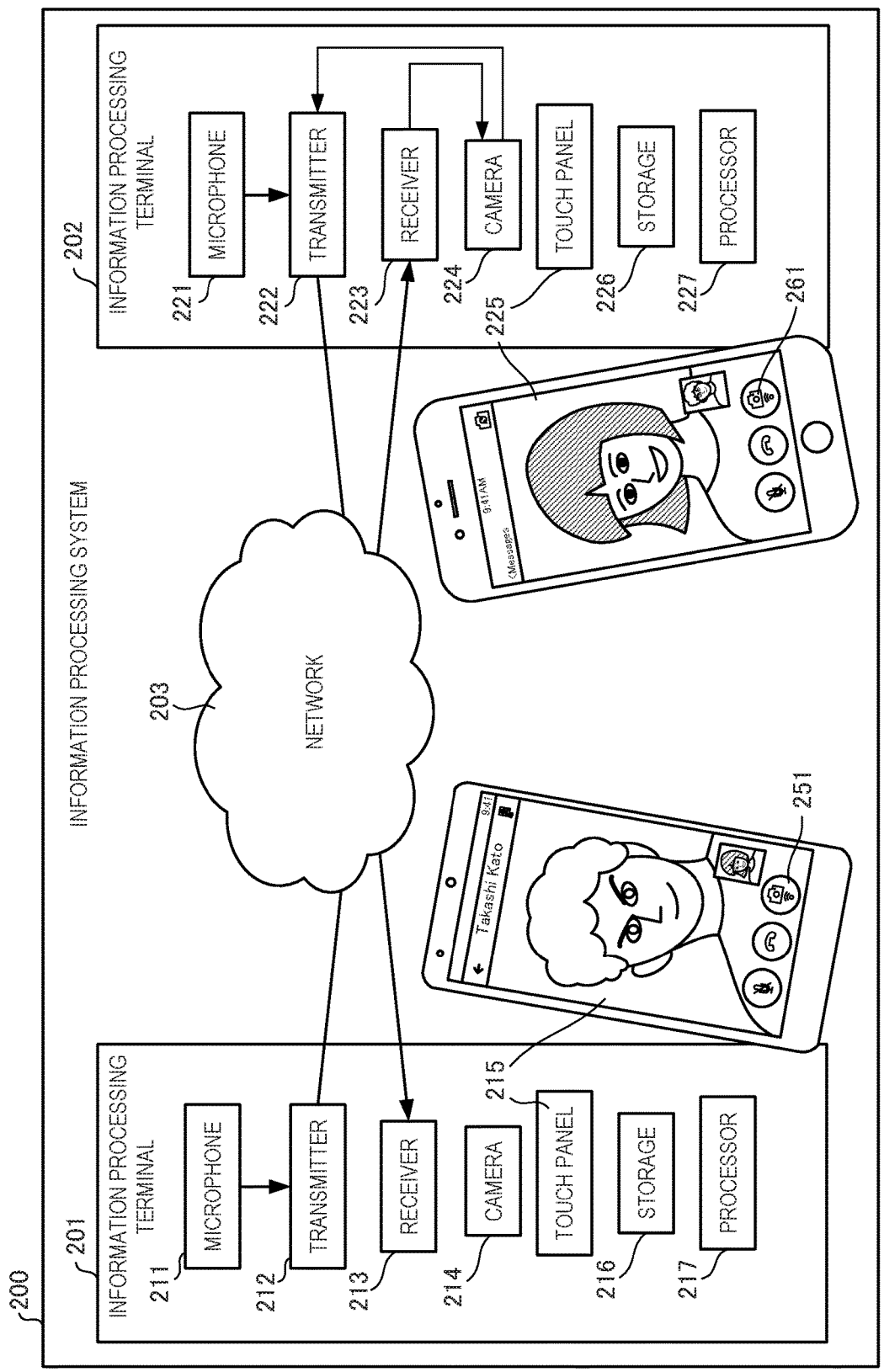
FIG. 2 is a block diagram showing the arrangement of an information processing system according to the second example embodiment of the present invention.

An information processing system according to the second example embodiment of the present invention will be described with reference to FIG. 2. FIG. 2 is a block diagram for explaining the functional arrangement of an information processing system 200 according to this example embodiment.

Information processing terminals 201 and 202 have the same arrangement, and include microphones 211 and 221, transmitters 212 and 222, and receivers 213 and 223 as well as cameras 214 and 224 and touch panels 215 and 225, respectively. Furthermore, the information processing terminals 201 and 202 include storages 216 and 226 and processors 217 and 227, respectively.

Each of the processors 217 and 227 implements various functions (for example, a video phone function) by executing various programs stored in each of the storages 216 and 226.

Each of the microphones 211 and 221 generates voice data by receiving a voice. The transmitter 212 specifies the information processing terminal 202 as a speech communication partner terminal, and transmits the voice data acquired from the microphone 211. The receiver 213 receives, via a network, the voice data transmitted from the transmitter 212.

During speech communication with the information processing terminal 201, the transmitter 222 transmits, to the information processing terminal 201, the voice data acquired from the microphone 221. The receiver 223 receives the voice data from the information processing terminal 201. The camera 224 performs image capturing to generate image data.

During speech communication with the information processing terminal 202, the transmitter 212 transmits, to the information processing terminal 202, together with the voice data, an operation command for operating the camera 224 incorporated in the information processing terminal 202.

The receiver 223 receives the operation command from the information processing terminal 201, and operates the camera 224. During speech communication with the information processing terminal 201, the transmitter 222 transmits, to the information processing terminal 201, together with the voice data acquired from the microphone 221, the image data acquired by performing image capturing using the camera 224.

These information processing terminals 201 and 202 can perform speech communication while seeing the faces of the partners on the video phones. By tapping a remote operation button 251 or 261 as an operation icon displayed on the touch panel 215 or 225 during speech communication, a state transits to a remote camera mode for remotely operating the camera of the partner terminal.

Figure 3:
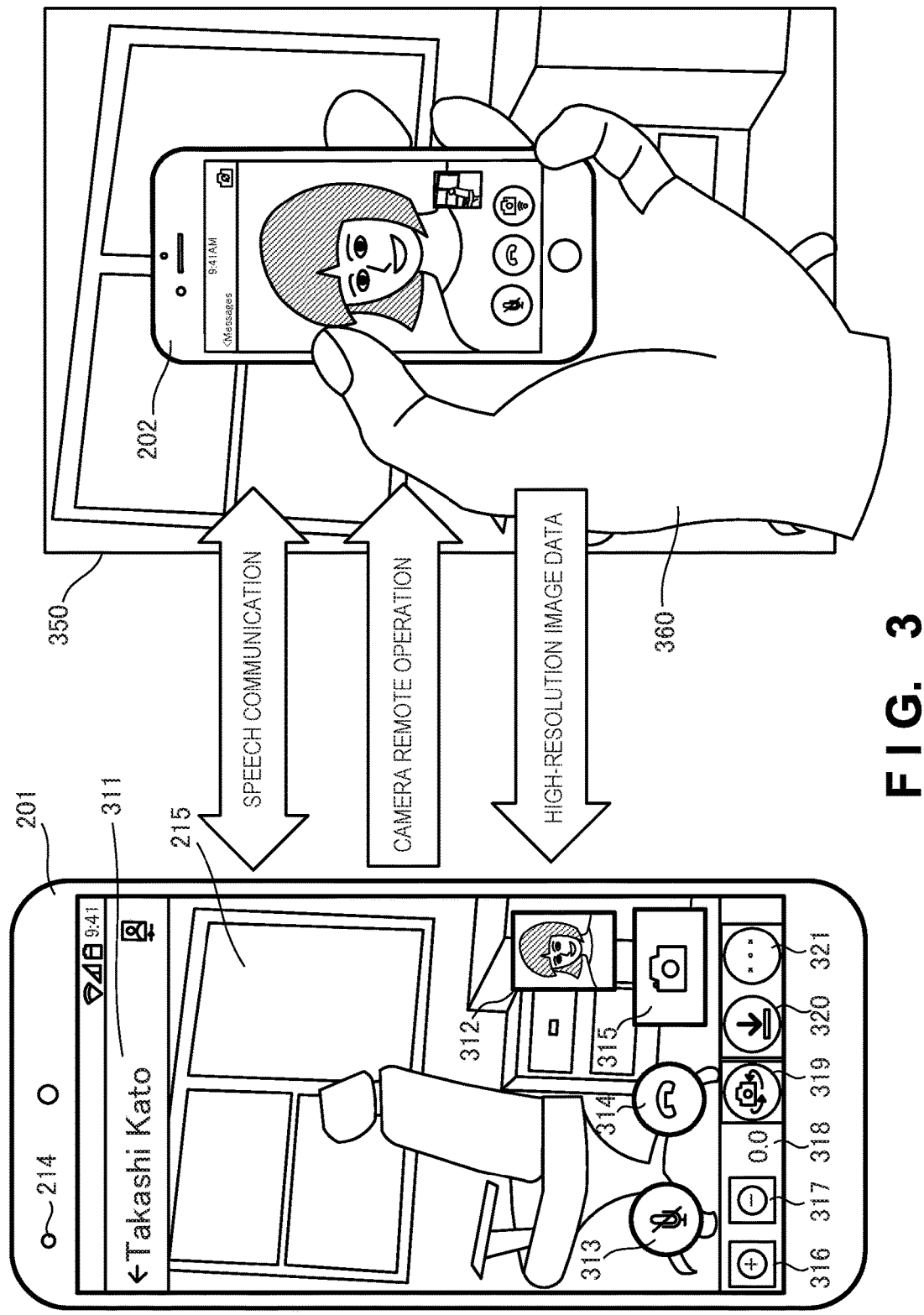
FIG. 3 is a view showing the display image arrangement of the information processing system according to the second example embodiment of the present invention.

FIG. 3 is a view for explaining a screen obtained when transiting to the remote camera mode during video speech communication. If the remote operation button 251 is tapped on the information processing terminal 201, a screen shown on the left side of FIG. 3 is displayed.

On the touch panel 215, a speech communication partner name 311, a picture-in-picture image, a microphone control button 313, and a speech communication disconnection button 314 are displayed during speech communication. In a picture-in-picture region 312, an image captured by the information processing terminal 201 as a self terminal is displayed. In this example, the face of the user of the information processing terminal 201, that is captured by the camera 214, is displayed.

If the remote operation button 251 is tapped, camera remote control buttons are displayed in addition to the above-described buttons and image. As the camera remote control buttons, a shutter button 315, a zoom-in button 316, a zoom-out button 317, a zoom magnification 318, a camera switching button 319, an image download button 320, and other camera control buttons 321 are displayed.

If, among these buttons, the camera switching button 319 is tapped, the driving camera of the information processing terminal 202 is switched to a rear camera (not shown), and live view imaging of a background 350 of the information processing terminal 202 is performed when viewed from a user 360.

A captured low-resolution image of the background 350 is sent to the information processing terminal 201 by RTP (Real-time Transport Protocol), and displayed large on the touch panel 215. If the zoom-in button 316 or the zoom-out button 317 is tapped in this state, the information processing terminal 202 drives the zoom function of the camera 224, and performs image capturing at a magnification desired by the user of the information processing terminal 201. The magnification is displayed as the zoom magnification 318. In this state as well, the user of the information processing terminal 201 and the user 360 of the information processing terminal 202 currently perform speech communication. Therefore, the user of the information processing terminal 201 can notify the user 360 of the information processing terminal 202 of a desired direction in which the camera of the information processing terminal 202 faces.

If an image for which the user of the information processing terminal 201 desires high-resolution image data is live-view displayed on the touch panel 215, the user of the information processing terminal 201 need only tap the shutter button 315. If the shutter button 315 is tapped, the information processing terminal 202 captures an image of the background 350 at a high resolution, and stores the image in the storage 226 of the information processing terminal 202. When the user taps the image download button 320, the high-resolution still image data saved in the storage 226 is sent from the information processing terminal 202 to the information processing terminal 201 and saved in the storage 216. At this time, the information processing terminal 202 transmits the data to the information processing terminal 201 using an RTP packet used for video phone communication but may transmit the data by another method.

If the other camera control buttons 321 are operated, image capturing by the camera 224 can be finely adjusted. For example, various image capturing settings such as a tone, brightness, and white balance can be adjusted.

A video phone application program including a GUI (Graphical User Interface) display module and a camera remote operation module is installed on each of the storages 216 and 226 of the information processing terminals 201 and 202, and executed by each of the processors 217 and 227. This implements the above-described displays and functions.

Figure 4:
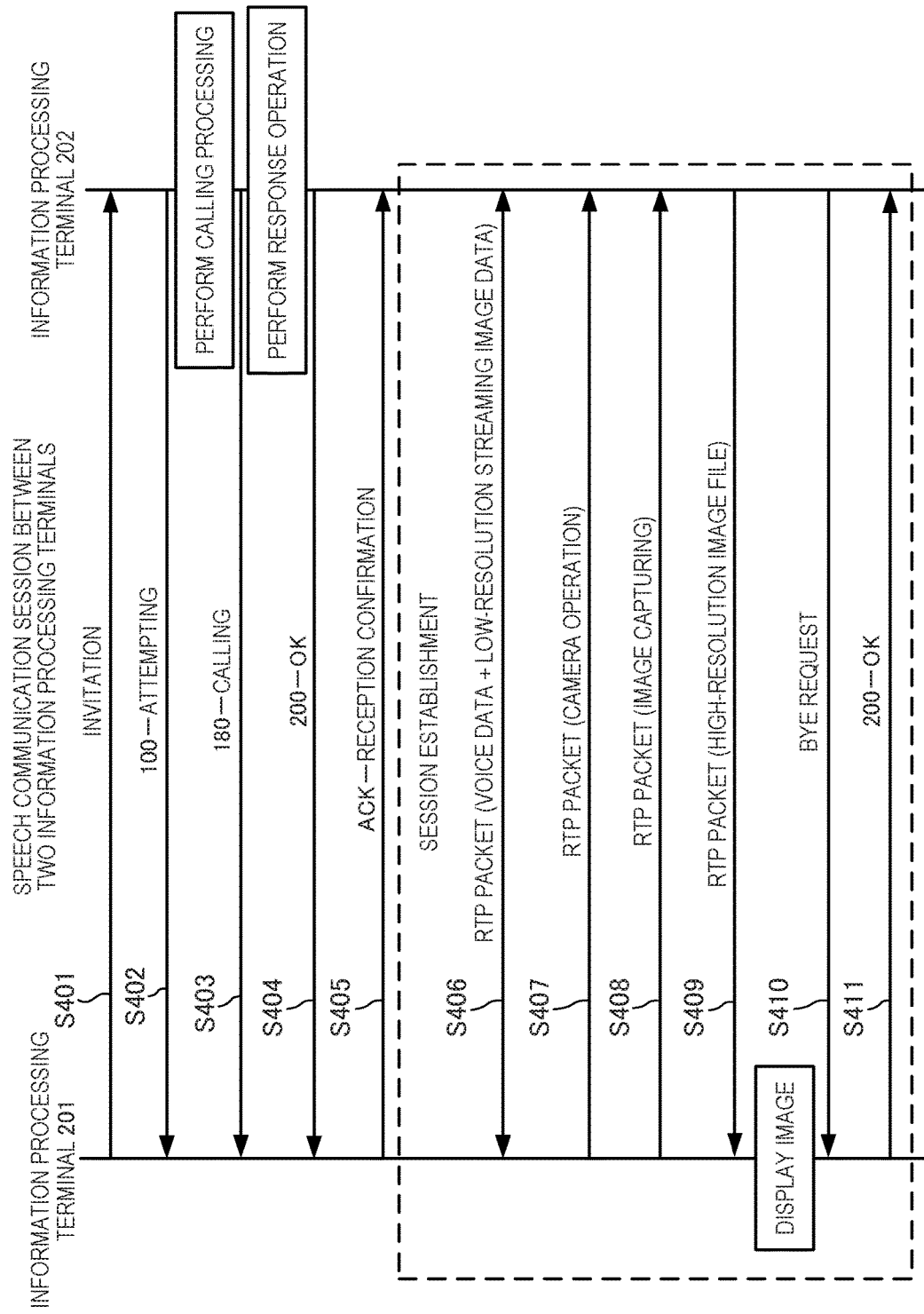
FIG. 4 is a sequence chart showing an example of signal exchange in the information processing system according to the second example embodiment of the present invention.

FIG. 4 is a sequence chart showing the procedure of signal exchange between the two information processing terminals 201 and 202.

In step S401, the information processing terminal 201 serving as an originator terminal transmits "invitation" to the information processing terminal 202. In step S402, the information processing terminal 202 serving as a receiver terminal returns an information response "100—attempting" to the information processing terminal 201.

If the information processing terminal 202 performs calling processing, and a call tone starts to ring, the information processing terminal 202 returns "180—calling" to the information processing terminal 201 (S404). If the information processing terminal 202 accepts a telephone answering operation (an operation of tapping or sliding an icon) from the user, the information processing terminal 202 returns, in step S404, "200—OK" to the information processing terminal 201. Next, the process advances to step S405, and the information processing terminal 201 returns "ACK—reception confirmation" to the information processing terminal 202. This establishes a session.

During the session, actual conversation is transmitted/received via an RTP packet in step S406, thereby establishing speech communication. In the case of video phone communication, voice data and moving image data (low-resolution streaming data) are placed on an RTP packet, thereby transmitting/receiving the data between the information processing terminals 201 and 202.

In step S407, during speech communication, the information processing terminal 201 transmits a camera operation request packet as part of an RTP packet to the information processing terminal 202 in accordance with a user operation. An operation command of the camera 224 is embedded in an RTP packet, and the information processing terminal 202 interprets the operation command from the packet to operate the camera 224. Upon receiving a camera operation request packet for the first time, the information processing terminal 202 activates the camera 224 to set a remote state.

Furthermore, if the information processing terminal 201 sends an image capturing command as part of an RTP packet to the information processing terminal 202 (S408), the information processing terminal 202 controls the camera 224 to perform image capturing at a high resolution.

In step S409, in response to a request from the information processing terminal 201, the information processing terminal 202 transmits the captured high-resolution image data to the information processing terminal 201 by RTP. The information processing terminal 201 displays the high-resolution image data received by RTP while maintaining the session.

To end the speech communication, one of the information processing terminals 201 and 202 sends a BYE request to the other terminal in step S410. Upon receiving the BYE request, the information processing terminal returns "200—OK" to the partner information processing terminal in step S411, thereby ending the session.

As described above, an IP phone sends a voice to an IP network by forming an RTP packet (IP-packetizing the voice). At this time, a voice and a camera operation command are RTP-packetized. However, the present invention is not limited to packet transmission/reception described above. An RTP packet of only a camera operation command may be additionally formed, or a camera operation and image data may be transmitted/received by a completely different type of packet.

FIG. 5 is a flowchart illustrating the procedure of camera operation processing performed in the information processing terminal 201.

If it is determined in step S501 that speech communication is in progress, it is determined in step S503 whether a remote operation instruction of the camera 224 is accepted. If the remove operation instruction for the touch panel 215 is accepted, the process advances from step S503 to step S505, and a remote operation command is transmitted to the information processing terminal 202.

In step S507, it is determined whether the shutter button 315 is tapped. If the shutter button 315 is tapped, the process advances to step S509, and a shutter command is transmitted to the information processing terminal 202.

If an image data download operation is accepted in step S511, the process advances to step S513, and image data is received from the information processing terminal 202. If the image data is received, the information processing terminal 201 displays, in step S514, the received image data on the touch panel 215.

Figure 6:
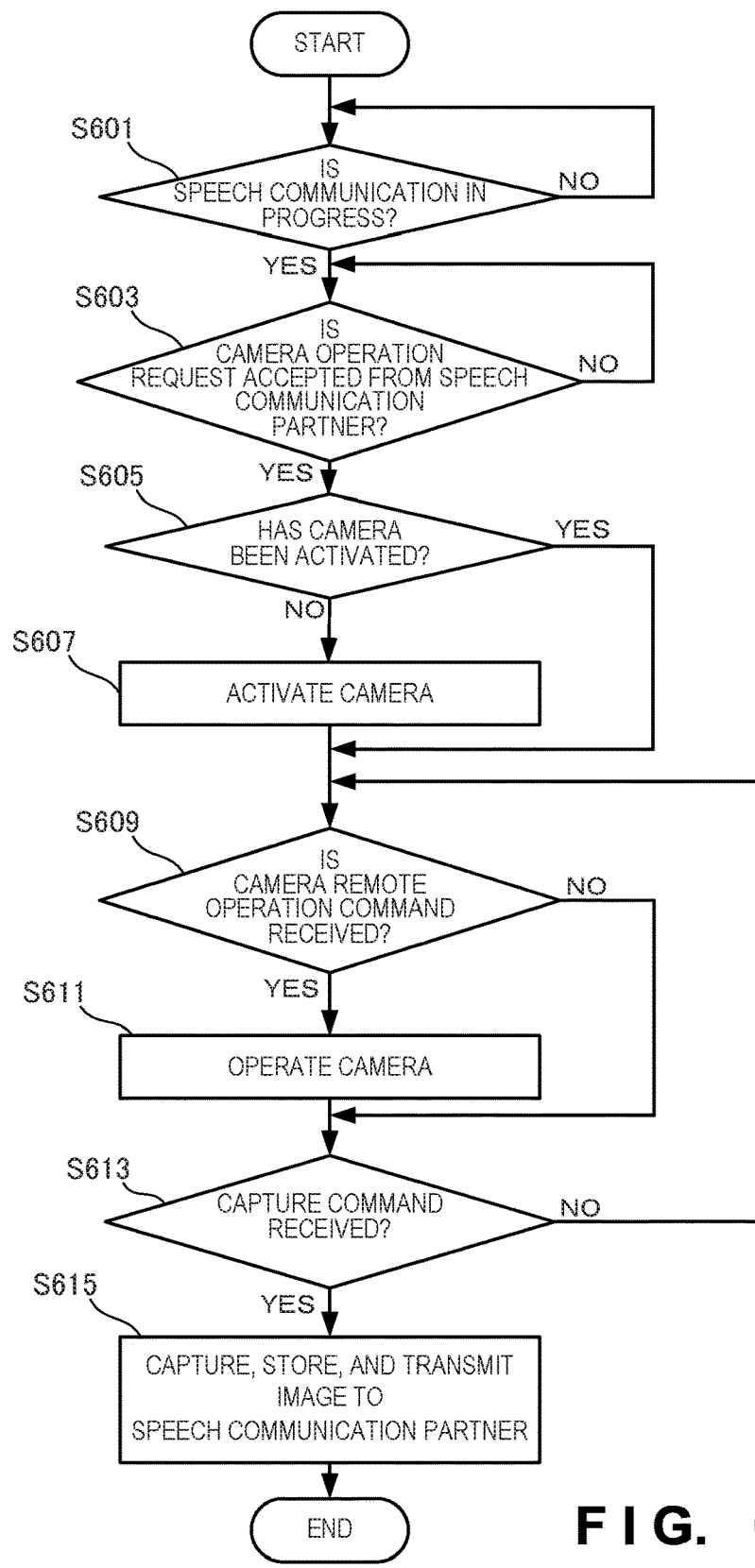
FIG. 6 is a flowchart illustrating the procedure of processing in an information processing terminal according to the second example embodiment of the present invention.

FIG. 6 is a flowchart illustrating the procedure of camera operation processing performed in the information processing terminal 202.

If it is determined in step S601 that speech communication is in progress, it is determined in step S603 whether a camera operation request is accepted from the speech communication partner. If the camera operation request is accepted, it is determined in step S605 whether the camera 224 has already been activated. If the camera 224 has not been activated, the process advances to step S607, and the camera 224 is activated.

Next, if a camera remote operation command is received in step S609, the process advances to step S611, and the processor 227 operates the camera 224.

If a shutter operation command is received in step S613, the process advances to step S615 in which image capturing is performed with high quality, and a high-resolution image data is stored, and is then transmitted in response to a request from the speech communication partner.

With the above arrangement, it is possible to perform preferable image capturing very easily using a partner terminal during speech communication.

Other Example Embodiments

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

The present invention is applicable to a system including a plurality of devices or a single apparatus. The present invention is also applicable even when an information processing program for implementing the functions of example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

Other Expressions of Example Embodiments

Some or all of the above-described example embodiments can also be described as in the following supplementary notes but are not limited to the followings.

(Supplementary Note 1)

There is provided an information processing system comprising a first information processing terminal and a second information processing terminal, the first information processing terminal including a first microphone that generates voice data by receiving a voice, a first transmitter that transmits the voice data acquired from the first microphone by specifying the second information processing terminal as a speech communication partner terminal, and a first receiver that receives voice data from the second information processing terminal, and the second information processing terminal including a camera that generates image data by performing image capturing, a second microphone that generates voice data by receiving a voice, a second transmitter that transmits, during speech communication with the first information processing terminal, the voice data acquired from the second microphone to the first information processing terminal, and a second receiver that receives the voice data from the first information processing terminal, wherein during speech communication with the second information processing terminal, the first transmitter transmits, to the second information processing terminal, together with the voice data, an operation command for operating the camera incorporated in the second information processing terminal, the second receiver receives the operation command from the first information processing terminal, and operates the camera, and during speech communication with the first information processing terminal, the second transmitter transmits, to the first information processing terminal, together with the voice data acquired from the second microphone, the image data acquired by performing image capturing using the camera.

(Supplementary Note 2)

There is provided the information processing system according to supplementary note 1, wherein the first information processing terminal further includes a display unit that displays information representing a speech communication partner, an operation icon for operating the camera, and the image data received from the second transmitter.

(Supplementary Note 3)

There is provided the information processing system according to supplementary note 2, wherein the second transmitter transmits, together with the voice data, moving image data captured by the camera, the first receiver receives the moving image data, and the display unit implements speech communication by video phone communication by displaying the received moving image data.

(Supplementary Note 4)

There is provided the information processing system according to supplementary note 2 or 3, wherein when the operation icon is operated, the first transmitter transmits the operation command for operating at least one of a shutter, a zoom magnification, brightness, white balance, and a resolution of the camera.

(Supplementary Note 5)

There is provided the information processing system according to any one of supplementary notes 1 to 4, wherein the first information processing terminal further includes a display unit that displays, during speech communication with the second information processing terminal, the image data transmitted from the second transmitter.

(Supplementary Note 6)

There is provided an information processing terminal comprising:

a first microphone that generates voice data by receiving a voice;

a first transmitter that transmits the voice data acquired from the first microphone by specifying another information processing terminal as a speech communication partner terminal; and a first receiver that receives voice data from the other information processing terminal, wherein it is possible to communicate with the other information processing terminal including a camera that generates image data by performing image capturing, a second microphone that generates voice data by receiving a voice, a second transmitter that transmits, during speech communication with the information processing terminal, the voice data acquired from the second microphone to the information processing terminal, and a second receiver that receives the voice data from the information processing terminal, during speech communication with the other information processing terminal, the first transmitter transmits, to the other information processing terminal, together with the voice data, an operation command for operating the camera incorporated in the other information processing terminal, and during speech communication with the other information processing terminal, the first receiver receives, from the other information processing terminal, together with the voice data, the image data acquired by performing image capturing using the camera.

(Supplementary Note 7)

There is provided an information processing terminal capable of communicating with another information processing terminal including a first microphone that generates voice data by receiving a voice, a first transmitter that transmits the voice data acquired from the first microphone by specifying the information processing terminal as a speech communication partner terminal, and a first receiver that receives voice data from the information processing terminal, the information processing terminal comprising:

a camera that generates image data by performing image capturing;

a second microphone that generates voice data by receiving a voice;

a second transmitter that transmits, during speech communication with the other information processing terminal, the voice data acquired from the second microphone to the other information processing terminal; and a second receiver that receives the voice data from the other information processing terminal, wherein the second receiver receives, together with the voice data, an operation command for operating the camera from the other information processing terminal, and operates the camera, and during speech communication with the other information processing terminal, the second transmitter transmits, to the other information processing terminal, together with the voice data acquired from the second microphone, the image data acquired by performing image capturing using the camera.

(Supplementary Note 8)

There is provided a control method of an information processing terminal including a first microphone that generates voice data by receiving a voice, a first transmitter that transmits the voice data acquired from the first microphone by specifying another information processing terminal as a speech communication partner terminal, and a first receiver that receives voice data from the other information processing terminal, the method comprising:

during speech communication with the other information processing terminal including a camera that generates image data by performing image capturing, a second microphone that generates voice data by receiving a voice, a second transmitter that transmits, during speech communication with the information processing terminal, the voice data acquired from the second microphone to the information processing terminal, and a second receiver that receives the voice data from the information processing terminal, transmitting, to the other information processing terminal, together with the voice data, an operation command for operating the camera incorporated in the other information processing terminal; and receiving, from the other information processing terminal, together with the voice data, the image data acquired by performing image capturing using the camera.

(Supplementary Note 9)

There is provided a control method of an information processing terminal capable of communicating with another information processing terminal including a first microphone that generates voice data by receiving a voice, a first transmitter that transmits the voice data acquired from the first microphone by specifying the information processing terminal as a speech communication partner terminal, and a first receiver that receives voice data from the information processing terminal, the information processing terminal including a camera that generates image data by performing image capturing, a second microphone that generates voice data by receiving a voice, a second transmitter that transmits, during speech communication with the other information processing terminal, the voice data acquired from the second microphone to the other information processing terminal, and a second receiver that receives the voice data from the other information processing terminal, the method comprising:

operating the camera by receiving, together with the voice data, an operation command for operating the camera from the other information processing terminal; and transmitting, during speech communication with the other information processing terminal, together with the voice data acquired from the second microphone, the image data acquired by performing image capturing using the camera to the other information processing terminal.

(Supplementary Note 10)

There is provided a control program of an information processing terminal including a first microphone that generates voice data by receiving a voice, a first transmitter that transmits the voice data acquired from the first microphone by specifying another information processing terminal as a speech communication partner terminal, and a first receiver that receives voice data from the other information processing terminal, the program for causing the information processing terminal to execute a method, comprising:

during speech communication with the other information processing terminal including a camera that generates image data by performing image capturing, a second microphone that generates voice data by receiving a voice, a second transmitter that transmits, during speech communication with the information processing terminal, the voice data acquired from the second microphone to the information processing terminal, and a second receiver that receives the voice data from the information processing terminal, transmitting, to the other information processing terminal, together with the voice data, an operation command for operating the camera incorporated in the other information processing terminal; and receiving, from the other information processing terminal, together with the voice data, the image data acquired by performing image capturing using the camera.

(Supplementary Note 11)

There is provided a control program of an information processing terminal capable of communicating with another information processing terminal including a first microphone that generates voice data by receiving a voice, a first transmitter that transmits the voice data acquired from the first microphone by specifying the information processing terminal as a speech communication partner terminal, and a first receiver that receives voice data from the information processing terminal, the information processing terminal including a camera that generates image data by performing image capturing, a second microphone that generates voice data by receiving a voice, a second transmitter that transmits, during speech communication with the other information processing terminal, the voice data acquired from the second microphone to the other information processing terminal, and a second receiver that receives the voice data from the other information processing terminal, the program for causing the information processing terminal to execute a method, comprising:

operating the camera by receiving, together with the voice data, an operation command for operating the camera from the other information processing terminal; and transmitting, during speech communication with the other information processing terminal, together with the voice data acquired from the second microphone, the image data acquired by performing image capturing using the camera to the other information processing terminal.

The invention claimed is:

1. An information processing system comprising a first information processing terminal and a second information processing terminal, said first information processing terminal including a first microphone that generates voice data by receiving a voice, a first transmitter that transmits the voice data acquired from said first microphone by specifying said second information processing terminal as a speech communication partner terminal, and a first receiver that receives voice data from said second information processing terminal, and said second information processing terminal including a camera that generates image data by performing image capturing, a second microphone that generates voice data by receiving a voice, a second transmitter that transmits, during speech communication with said first information processing terminal, the voice data acquired from said second microphone to said first information processing terminal, and a second receiver that receives the voice data from said first information processing terminal, wherein during normal speech communication with said second information processing terminal, said first transmitter transmits, to said second information processing terminal, together with the voice data, an operation command for operating said camera incorporated in said second information processing terminal, said second receiver receives the operation command from said first information processing terminal, and operates said camera, and during normal speech communication with said first information processing terminal, said second transmitter transmits, to said first information processing terminal, together with the voice data acquired from said second microphone, the image data acquired by performing image capturing using said camera.

2. The information processing system according to claim 1, wherein said first information processing terminal further includes a display unit that displays information representing a speech communication partner, an operation icon for operating said camera, and the image data received from said second transmitter.

3. The information processing system according to claim 2, wherein
said second transmitter transmits, together with the voice data, moving image data captured by said camera,
said first receiver receives the moving image data, and
said display unit implements speech communication by video phone communication by displaying the received moving image data.

4. The information processing system according to claim 3, wherein
when the operation icon is operated, said first transmitter transmits the operation command for operating at least one of a shutter, a zoom magnification, brightness, white balance, and a resolution of said camera.

5. The information processing system according to claim 1, wherein said first information processing terminal further includes a display unit that displays, during speech communication with said second information processing terminal, the image data transmitted from said second transmitter.

6. A control method of an information processing terminal including
a first microphone that generates voice data by receiving a voice,
a first transmitter that transmits the voice data acquired from the first microphone by specifying another information processing terminal as a speech communication partner terminal, and
a first receiver that receives voice data from the other information processing terminal,
the method comprising:
during normal speech communication with the other information processing terminal including
a camera that generates image data by performing image capturing,
a second microphone that generates voice data by receiving a voice,
a second transmitter that transmits, during normal speech communication with the information processing terminal, the voice data acquired from the second microphone to the information processing terminal, and
a second receiver that receives the voice data from the information processing terminal,
transmitting, to the other information processing terminal, together with the voice data, an operation command for operating the camera incorporated in the other information processing terminal; and
receiving, from the other information processing terminal, together with the voice data, the image data acquired by performing image capturing using the camera.

7. A control method of an information processing terminal capable of communicating with another information processing terminal including
a first microphone that generates voice data by receiving a voice,
a first transmitter that transmits the voice data acquired from the first microphone by specifying the information processing terminal as a speech communication partner terminal, and
a first receiver that receives voice data from the information processing terminal,
the information processing terminal including
a camera that generates image data by performing image capturing,
a second microphone that generates voice data by receiving a voice,
a second transmitter that transmits, during normal speech communication with the other information processing terminal, the voice data acquired from the second microphone to the other information processing terminal, and
a second receiver that receives the voice data from the other information processing terminal,
the method comprising:
operating the camera by receiving, together with the voice data, an operation command for operating the camera from the other information processing terminal; and
transmitting, during normal speech communication with the other information processing terminal, together with the voice data acquired from the second microphone, the image data acquired by performing image capturing using the camera to the other information processing terminal.

* * * * *